United States Patent
Wagner

(12) 
(10) Patent No.: US 6,609,082 B2
(45) Date of Patent: Aug. 19, 2003

(54) MACHINE CONTROL DEVICE

(76) Inventor: David S. Wagner, 7788 Timberline Rd., Oconto Falls, WI (US) 54154

( * ) Notice: Subject to any disclaimer, the term of this patent is extended or adjusted under 35 U.S.C. 154(b) by 149 days.

(21) Appl. No.: 09/813,470

(22) Filed: Mar. 22, 2001

(65) Prior Publication Data

US 2002/0138232 A1 Sep. 26, 2002

(51) Int. Cl.[7] .............................................. G06F 19/00
(52) U.S. Cl. ........................................ 702/182; 701/30
(58) Field of Search ................................ 702/182, 183, 702/184, 34; 701/1, 29, 30; 340/438, 439, 459

(56) References Cited

U.S. PATENT DOCUMENTS

| | | | |
|---|---|---|---|
| 3,713,090 A | | 1/1973 | Dickenson |
| 4,251,813 A | | 2/1981 | Carre |
| 4,612,623 A | | 9/1986 | Bazarnik |
| 4,739,482 A | * | 4/1988 | Wrigge ......................... 701/30 |
| 4,884,054 A | * | 11/1989 | Moon, Sr. .............. 340/309.15 |
| 5,267,147 A | | 11/1993 | Harshaw et al. |
| 5,339,339 A | * | 8/1994 | Petitclerc et al. ............ 376/245 |
| 5,446,672 A | * | 8/1995 | Boldys ........................ 700/174 |
| 5,454,074 A | | 9/1995 | Hartel et al. |
| 5,513,107 A | * | 4/1996 | Gormley ...................... 701/48 |
| 5,642,284 A | * | 6/1997 | Parupalli et al. .............. 701/30 |
| 5,680,328 A | | 10/1997 | Skorupski et al. |
| 5,694,318 A | | 12/1997 | Miller et al. |
| 5,705,977 A | * | 1/1998 | Jones ....................... 340/457.2 |
| 5,864,784 A | | 1/1999 | Brayton et al. |
| 6,141,629 A | * | 10/2000 | Yamamoto et al. .......... 702/187 |
| 6,172,602 B1 | * | 1/2001 | Hasfjord ..................... 340/438 |
| 6,212,449 B1 | * | 4/2001 | Wellman et al. ............... 701/29 |
| 6,317,668 B1 | * | 11/2001 | Thibault ....................... 701/35 |
| 6,430,488 B1 | * | 8/2002 | Goldman et al. .............. 701/36 |
| 6,459,367 B1 | * | 10/2002 | Green et al. ................. 340/440 |
| 6,505,106 B1 | * | 1/2003 | Lawrence et al. ............. 701/35 |
| 2002/0143445 A1 | * | 10/2002 | Sinex ........................... 701/29 |

OTHER PUBLICATIONS

Anon., Shockswitch SC1000 Series Brochure, one sheet, no date, Shockwatch, Dallas, Texas.
Anon., Shockswitch Remote SRC1000 Series Brochure, one sheet, no date, Shockwatch, Dallas, Texas.
Anon., Shockswitch Plus Brochure, one sheet, no date, Shockwatch, Dallas, Texas.
Anon., Shockswitch ID Brochure, one sheet, no date, Shockwatch, Dallas, Texas.
Anon., Shockswitch at worl . . . Brochure, one sheet, no date, Shockwatch, Dallas, Texas.
Anon., Getting Started with iTruckMAIL Brochure, one sheet, Sep., 2000, Qualcomm Inc., location unknown.
Anon., iTruckMAIL Web–Based Service Brohcure, one sheet, no date, Qualcomm Inc., location unknown.

* cited by examiner

Primary Examiner—Patrick Assouad
(74) Attorney, Agent, or Firm—Tipton L. Randall

(57) ABSTRACT

The present invention is directed to a control system device that forces a machine operator to comply with the regulation by not allowing the machine to operate until the maintenance log has been completed. By disabling the equipment, the control unit prevents an operator from starting or operating the equipment prior to performing the required checks and documenting his/her identification number for verification purposes. Once the log has been entered, the system provides numerous methods for downloading of the data for long-term storage and retrieval. The system also has provisions to alert the managerial staff if the equipment is operated beyond the minimum check period while providing for a means to notify the operator that the required check interval has been reached.

27 Claims, 8 Drawing Sheets

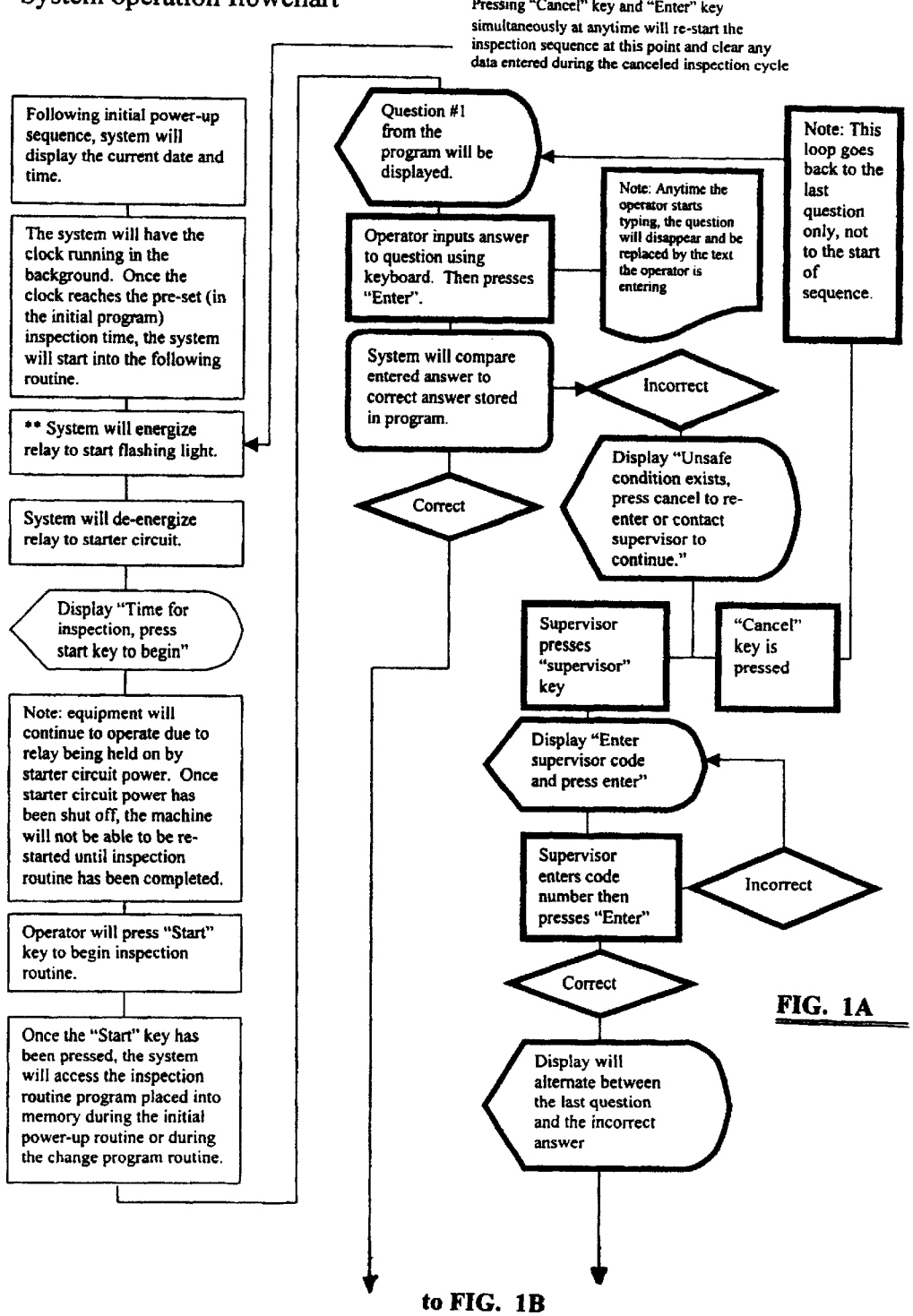

Routine at Initial Power-up
Enter Supervisory Code, Time / Date, Text of Questions / Answers, Machine ID# to FIG. 2B

Routine to Download data from controller to remote storage computer.

Routine to download data if system memory capacity is reached.

MACHINE CONTROL DEVICE

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention.

The present invention relates generally to a machine control device, and more specifically, to a device that periodically requires the operator to perform a safety and operational inspection on the controlled machine.

2. Background Information.

In all areas of industry, proper maintenance of machinery is an important task that is valuable for maintaining high levels of production and preservation of valuable equipment. Poorly maintained machinery or equipment can result in breakdown or accidents that may lead to personal injury or fatalities for individuals in the work area.

With proper maintenance of machinery directly related to worker safety, the government has become involved by mandating through regulations that various inspections, safety checks and/or preventive maintenance be regularly performed, and that records be maintained to verify compliance with these mandated regulations.

One such mandated regulation from the Occupational Safety and Health Administration (OSHA) requires that fork truck inspection logs be generated for every shift of operation. Current OSHA regulation (1910.178) requires the owners of forklift equipment to perform a safety and operational inspection once during each shift of equipment operation. The most popular method of complying with this regulation is to attach a paper checklist to the forklift and require the operator of the equipment to fill out and sign this log prior to the start of his/her shift. Many companies have problems complying with this regulation. The primary reasons for these difficulties are; 1) operators do not take the time to fill out the log; 2) multiple operators of one piece of equipment make it difficult to know when the inspection was performed or who is responsible for completing the inspection log; 3) maintaining the hard copy of these logs requires file space and personnel to maintain an accurate record; and 4) the hard copy log needs to be hand delivered to the office for filing.

The control system of the present invention remedies these problems by forcing the operator to comply with the regulation by not allowing the equipment to operate until the log has been completed. By disabling the equipment, the control unit prevents an operator from starting or operating the equipment prior to performing the required checks and documenting his/her identification number for verification purposes. Once the log has been entered, the system provides numerous methods for downloading of the data for long-term storage and retrieval. The system also has provisions to alert the managerial staff if the equipment is operated beyond the minimum check period while providing for a means to notify the operator that the required check interval has been reached.

Another area where the present invention finds application is within the production machinery arena (machine tools, production line, packaging equipment, etc). Within this broad industry, machinery requires frequent preventive maintenance. As budgets are reduced within manufacturing organizations, the responsibility of many of these preventive maintenance operations is left to the individual operators of the equipment. These industries face a problem similar to the forklift industry in guaranteeing that maintenance is being performed at the proper interval. Again, the device of the present invention prevents the operation of the controlled equipment without the proper maintenance and/or checks being preformed and an operator identification logged against this procedure. The device disables the piece of equipment until such time as a checklist has been completed and electronically signed.

Some examples of machine control devices or systems for which patents have been granted include the following.

In U.S. Pat. No. 3,713,090, Dickinson discloses an aircraft checklist device that provides audible checklists, both normal and emergency, for a pilot to follow. After each item in the checklist is broadcast, the pilot presses an advance button to move to the next item in the list.

Carre, in U.S. Pat. No. 4,251,813 describes an electronic checklist using solid state display to show sixteen alphanumeric characters to be presented at one time. The user selects the instruction set and then increments the instructions in the set after each one is accomplished.

U.S. Pat. No. 4,612,623 by Bazarnik discloses a tamper-resistant, running time maintenance monitor with message display. The monitor indicates that equipment operatively connected to the monitor is due for maintenance at a specified period of time.

In U.S. Pat. No. 5,267,147, Harshaw et al. describe a portable checklist device having alphanumeric data in a sequence of checklist items. A display and a voice synthesizer selectively outputs checklist items to the user, who enters responses by a keypad having a plurality of control switches. The portable device stores a log of the session that can be downloaded to a cradle and printed out in a predetermined format.

Hartel et al., in U.S. Pat. No. 5,454,074, disclose a method for an electronic checklist associated with aircraft flight operations. Both normal and non-normal checklists are included in the method.

U.S. Pat. No. 5,694,318 by Miller et al. describes a vehicular data system for operating away from premises of a remote host computer system. The remote host computer system stores delivery information for use by the vehicle data system in the delivery of good and services. The delivery information is transmitted by wireless communication means.

In U.S. Pat. No. 5,680,328 Skorupski et al. disclose a computer assisted driver inspection system for use in conjunction with a fleet of vehicles for complying with pre- and post-trip inspection report requirements, while improving fleet maintenance and operations efficiency. An on-board computer is used to receive, store and transmit data input by the drivers and maintenance personnel. A ground support system receives inspection data in real time.

Brayton et al., in U.S. Pat. No. 5,864,784, describes a nuclear facilities checklist device that includes a data collection and monitoring system having a hand held computer unit which collects data, compares data with historical trends and safety limits, and guides the user through procedural steps. The unit has a means to allow automatic transfer of the colleted data to a main computer data base for further review, reporting, and distribution purposes.

Consequently, applicant has invented a machine control device that periodically requires the operator to perform a safety and operational inspection on the controlled machine while providing many additional features that are unique to the structure described herein.

SUMMARY OF THE INVENTION

The present invention is directed to a device that includes an electronic timed interval inspection and data storage system for machinery. The present invention is exemplified in a number of implementations and applications, some of which are summarized below.

According to an example embodiment, the present invention includes an on-board computer associated with a machine, the on-board computer including means for receiving data input by a machine operator, and by a supervisor in response to an input by the operator. The computer is adapted for timing an interval to require the operator and optionally the supervisor to input data. The computer presents queries and receives data input by the machine operator, including a unique identification assigned to the operator. The computer optionally receives a response from the supervisor, including a unique identification assigned to the supervisor, the response indicative of a machine problem. The computer controls a first relay device contained within a machine starter circuit that completes the machine starter circuit with the first relay device closed. The computer also controls a second relay device contained within a visual indicator device circuit that completes the visual indicator device circuit with the second relay device closed. The computer also stores data input received from the operator and from the supervisor; and transfers stored data to another storage device. Also disclosed is a method for providing timed interval inspection reporting and data storage for machinery that employs the above described computer.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 1A–1C shows a systems operation flowchart for one embodiment of the present invention.

Figure 1B:
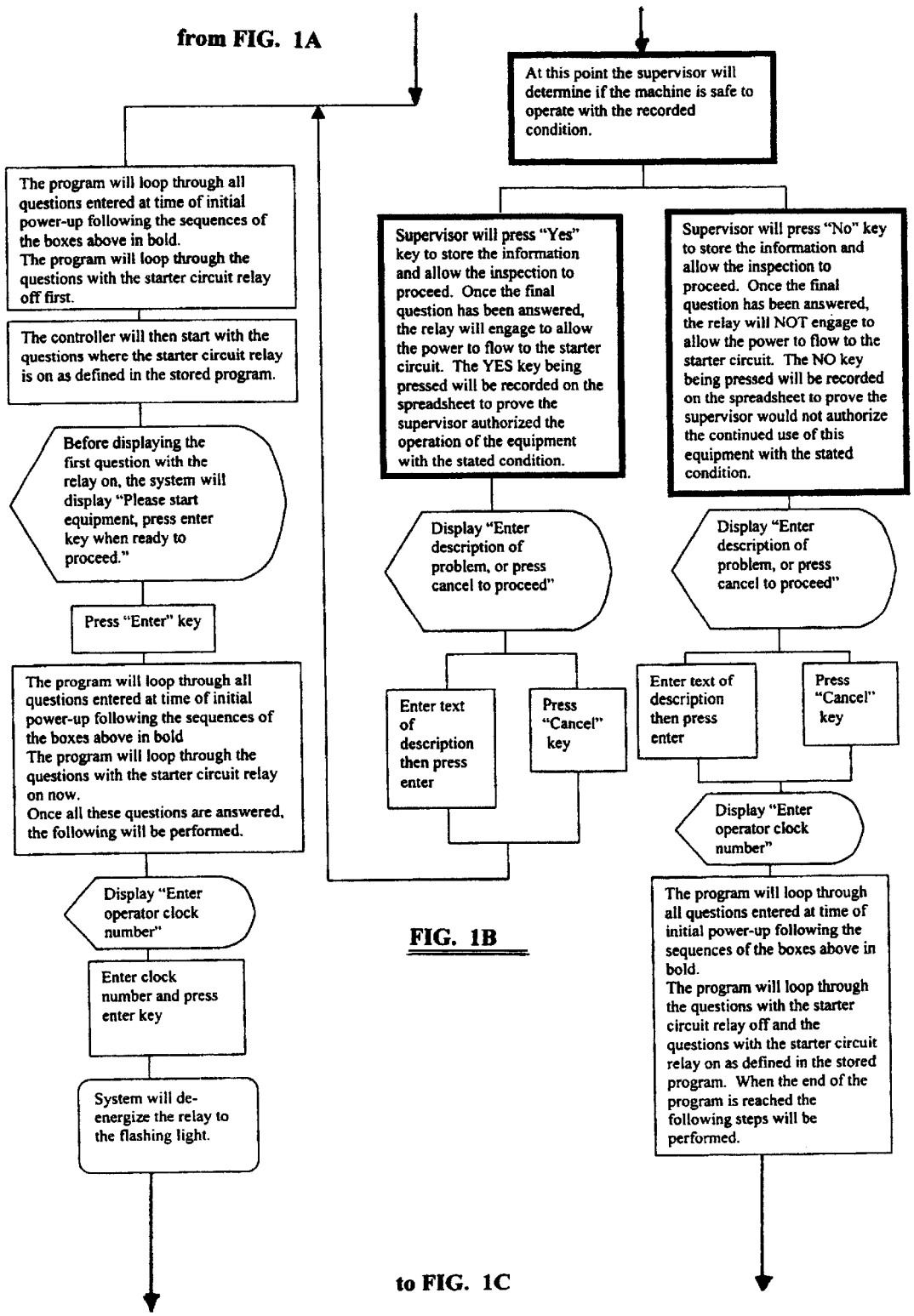

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DESCRIPTION OF THE EMBODIMENTS

The present invention is believed to be applicable to an electronic timed interval inspection and data storage system for machinery including, but not limited to, fork trucks. While the present invention is not limited to a specific machine industry, an appreciation of various aspects of the invention is best gained through a discussion of various examples using the fork truck application.

According to a particular embodiment, the present invention comprises a controller device that includes an on-board computer having a processor, data storage, an internal clock, a power source, a viewing screen and data input means such as a keyboard or a touch screen. The controller device is hardwired to a relay contained in the machine starter circuit and to a relay in a visual indicator circuit, with a visual indicator such as a flashing light powered by the indicator circuit.

The controller of the present invention installed on a machine, such as a fork truck, operates as follows. At preset timed intervals during the day, for example once every eight hour shift, the equipment operator is required to answer a series of questions that the controller prompts on the display screen. The operator is prompted to answer these questions in two ways. One: the display screen will display a message stating "Time for Inspection, press start key to begin"; two: a warning light found on the top of the case or mounted to the equipment itself begins flashing. At the timed mark, the controller attempts to de-energize (open) the relay on the starter circuit, and to display the message "Time for Inspection, press start key to begin", and also energize (close) the relay providing the power to the flashing warning light. Note: If the starter circuit is already engaged (machine running or in operation), the relay attempts to open, but is held in the closed position until the starter circuit is physically shut off by the operator. The starter circuit power remains on even though the equipment is due for inspection or maintenance because of safety concerns. If the power were to unexpectedly shut off with the equipment in mid-cycle or while handling a load, there could be dangerous consequences. By keeping the system power operational, even though inspection is due, the operator can choose the best (safest) time to disable the equipment and perform the check procedure. The warning light continues to flash alerting the operator and supervisor that the equipment is due for inspection as soon as the situation permits.

Figure 1C:
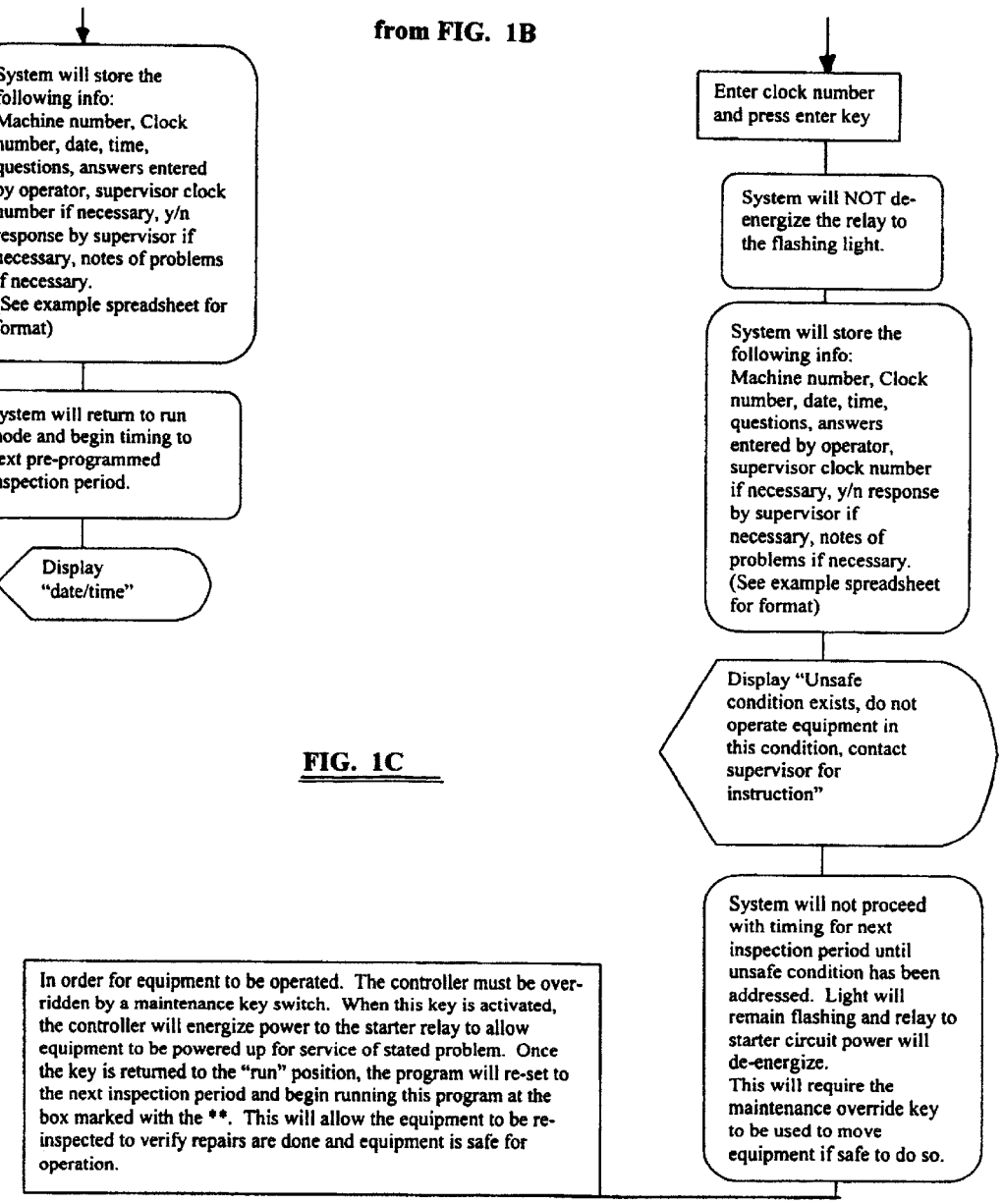
Figure 2A:
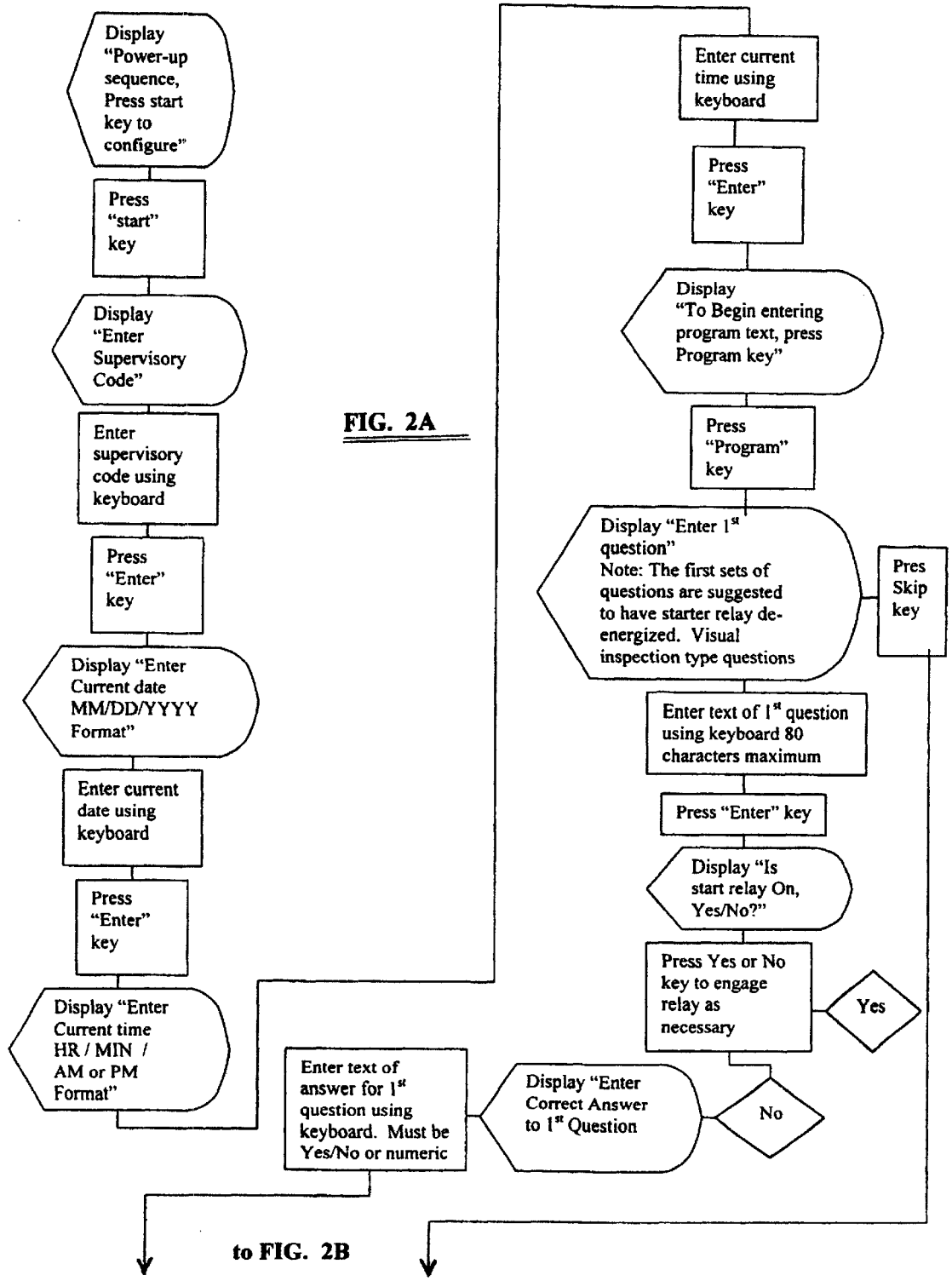
FIGS. 2A–2B shows an initial power-up routine flowchart for one embodiment of the present invention.
Figure 2B:
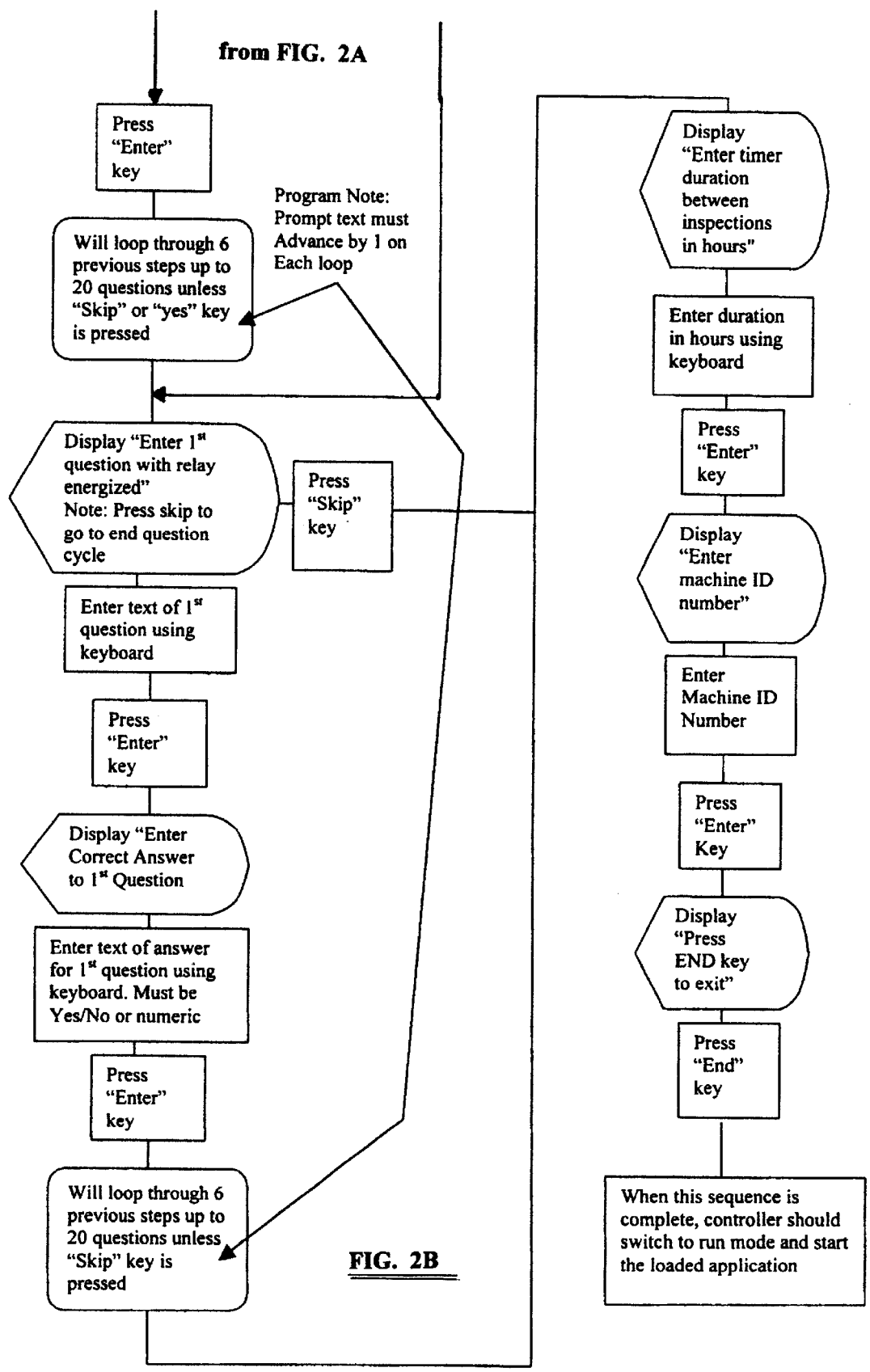

After the operator presses the start key, the program begins running through the pre-defined set of questions, as shown in the system operation flowchart of FIG. 1. These questions are entered at system power-up using the routine demonstrated in the routine at initial power-up flowchart of FIG. 2. The questions are text based and fit on a display screen of limited size. The questions are asked in a manner that requires the answers to be either numeric or yes/no in nature.

The first set of questions the program prompts the operator to answer consists of visual type inspection questions. The questions do not require the machine to be operational, that is, the key is off or the run cycle has not been started.

Once these questions are answered properly, the program energizes (close) the relay for the starter circuit of the machine and prompts the operator to start the machine via an on screen message. At this point, the program continues with the second set of questions that require the machine to be in operation for inspection.

If during the course of answering any of the questions, an incorrect answer is entered, the program prompts the operator to obtain supervisor approval by displaying "Unsafe condition exists, contact supervisor to continue". The control system requires a supervisor to enter an access code, then prompts the supervisor to decide if the equipment can be safely operated as is. Once this decision has been entered, the controller asks for any notes pertaining to this problem. The notes are limited to the screen size. If no notes are required, pressing the cancel key allows the inspection to proceed, as shown in the system operation flowchart of FIG. 1. At any time during the inspection, the operator can press the cancel and enter key at the same time and the program resets to the start of the last question, as seen in the flow chart of FIG. 1.

Following completion of all questions, the controller prompts the operator to enter his/her identification number. Once all the questions have been properly answered and the operator identification number entered, the controller does three things. One: Stores the questions and answers that were entered under a time/date stamp along with any problem notes, supervisor codes, operator identification number and machine identification number associated with this controller (machine number). Two: de-energize (open) the relay providing power to the flashing warning light. Three: displays the time and date on the display screen.

Once the relay to the starter circuit power is energized (closed), the program allows the relay to remain closed until the next pre-determined inspection time occurs (controller will be in standard run mode). At the next time mark, the controller attempts to de-energize (open) the relay on the starter circuit (held open until circuit is shut off), displays a message "Warning, Time for Inspection", and re-energize (close) the relay providing power to the flashing warning light. The above described inspection routine is again repeated.

Figure 3:
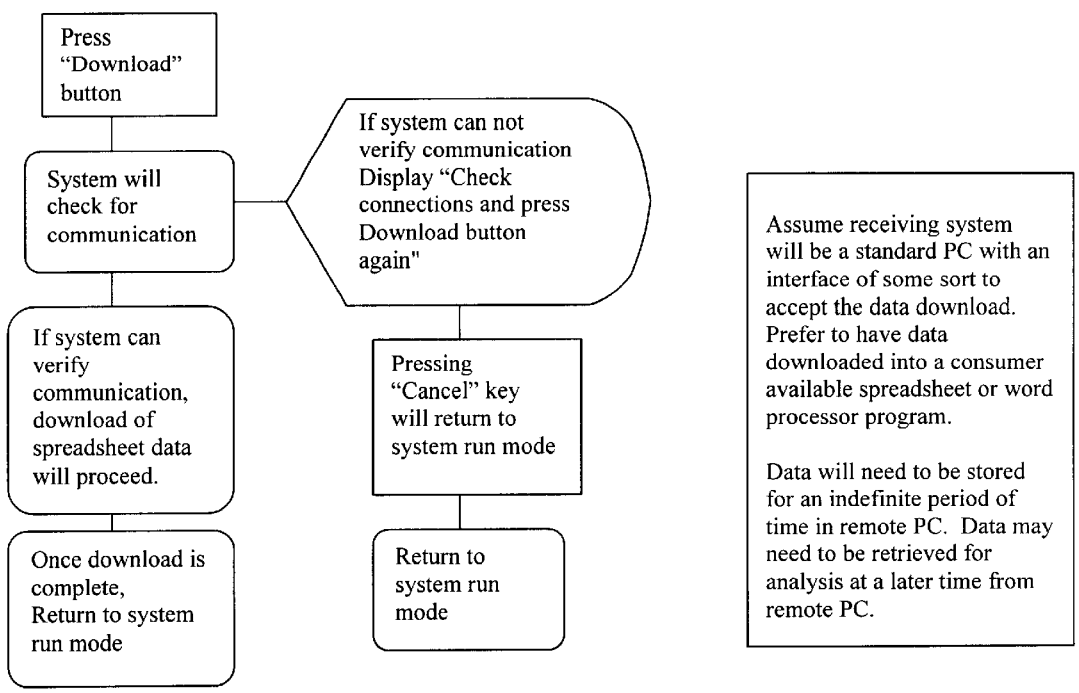
FIG. 3 shows a download routine flowchart for one embodiment of the present invention.
Figure 4:
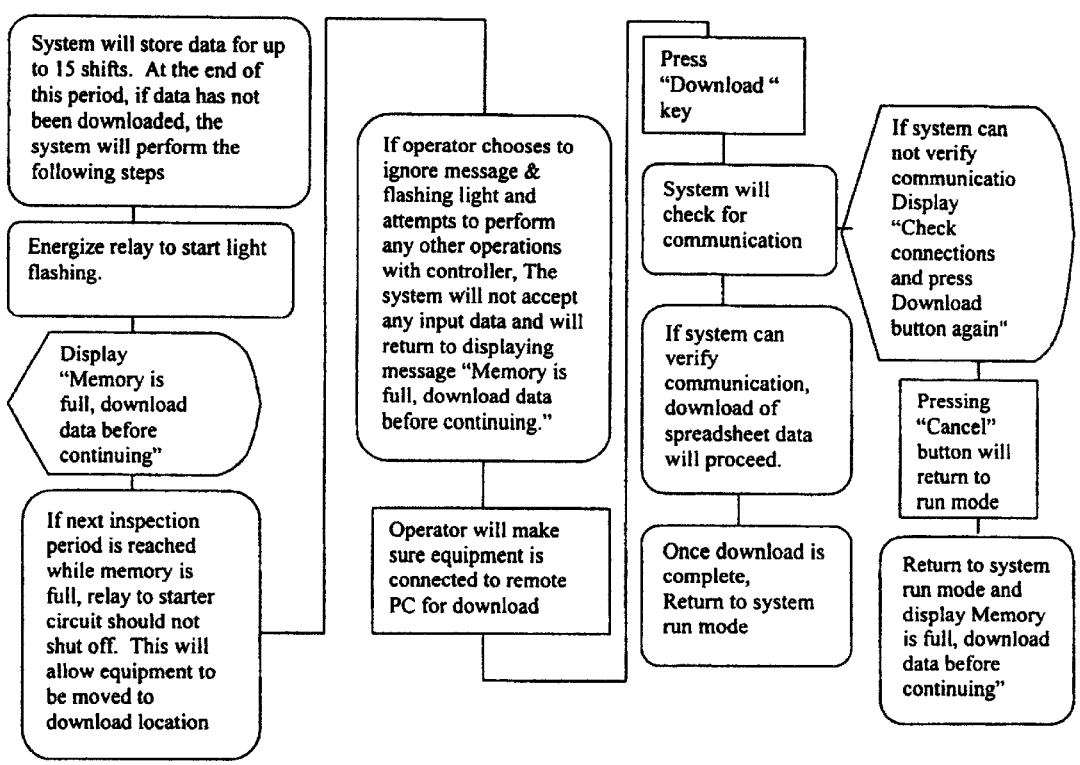
FIG. 4 shows a download routine flowchart for another embodiment of the present invention.
Figure 5:
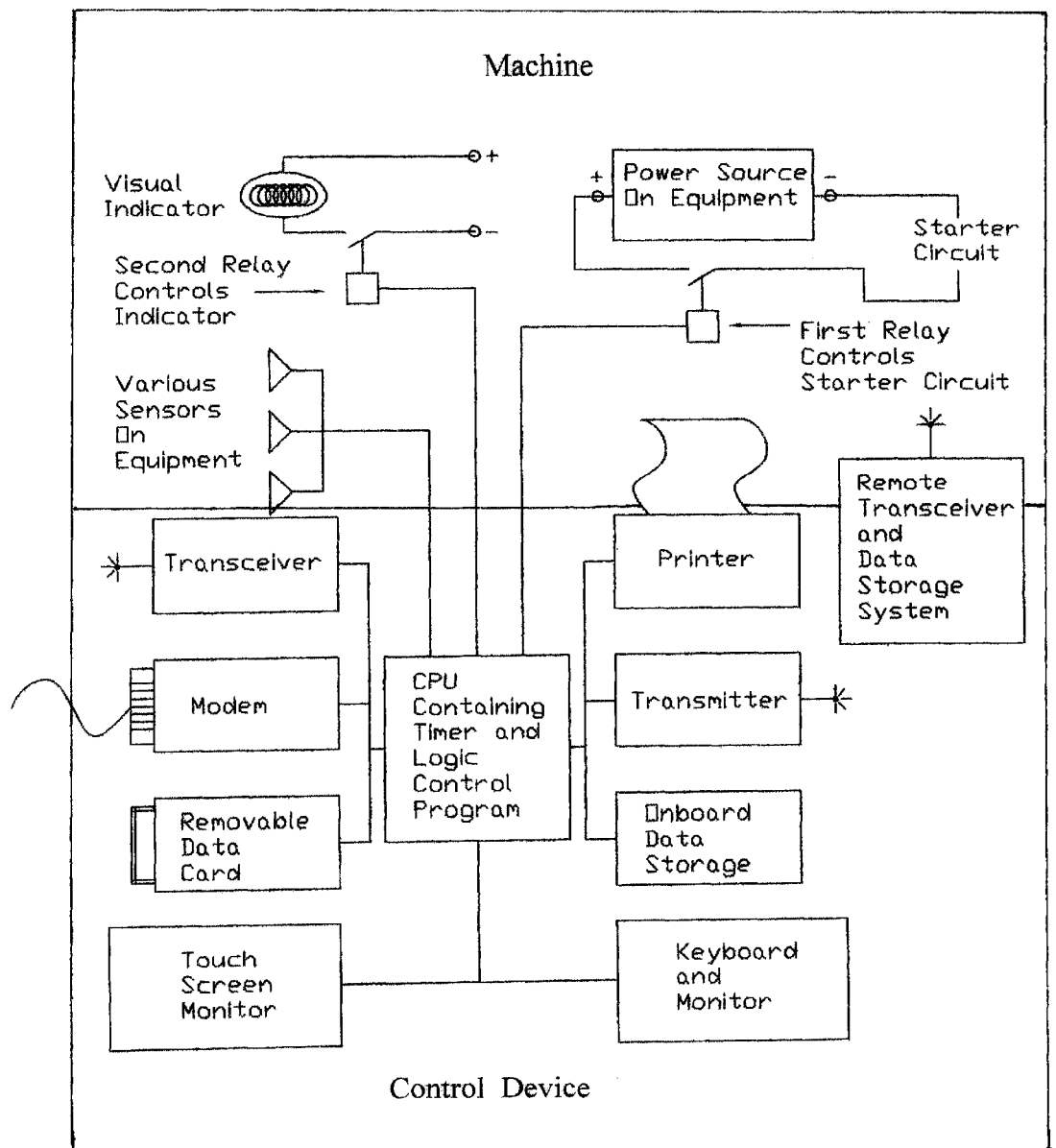
FIG. 5 shows a block diagram representation of a machine controlled by the electronic timed interval inspection reporting and data storage system of the present invention.

Turning the start switch on the equipment to the off position after the controller reaches the timed inspection period (where the light starts flashing and the relay to the starter circuit de-energizes) prevents the machine from being re-started until the questions are answered correctly. The control unit has the ability to download the stored data into an offline storage device such as a personal computer. The format and method of downloading the data may include a portable data card, a data modem, a radio frequency transceiver or an on-board printer. Refer to the flowchart of FIG. 3 for the steps required for the routine to download data for the controller system. FIG. 4 presents the steps required to download data when the memory capacity of the device is reached.

In a further embodiment of the invention, the controller includes a transmitter device that signals a pager device should the inspection program not be performed as required by the controller. The supervisor retains the pager device to be alerted of such a problem.

In yet a further embodiment of the invention, the controller is in communication with sensors strategically placed on the machinery fitted with the controller. The controller automatically polls the sensors to monitor the status of the equipment and records these data at each predetermined inspection interval. Equipment parameters, such as oil levels, oil pressure, coolant levels, fuel levels and/or pressures, engine temperature, etc., are monitored by the sensors with the resulting data communicated to the controller for recording and storage. The sensor monitor data are downloaded with the inspection and maintenance data for retention in an external storage device.

While the present invention has been described with reference to several particular example embodiments, those skilled in the art will recognize that many changes may be made thereto without departing from the spirit and scope of the present invention, which is set forth in the following claims.

I claim:

1. An electronic timed interval inspection reporting and data storage system for machinery comprising:
   an on-board computer associated with a machine, the on-board computer including means for receiving data input by a machine operator, and data input by a supervisor in response to an input by said operator, said computer adapted for:
   (i) timing an interval to require the operator and optionally the supervisor to input data;
   (ii) presenting queries to the machine operator;
   (iii) receiving data input by the machine operator in response to said queries, said data including a unique identification assigned to the operator, and optionally for receiving a response from the supervisor, including a unique identification assigned to the supervisor, the supervisor response indicative of a machine problem;
   (iv) controlling a first relay device contained within a machine starter circuit which completes the machine starter circuit with the first relay device closed;
   (v) controlling a second relay device contained within a visual indicator device circuit which completes the visual indicator device circuit with the second relay device closed;
   (vi) storing data input in a storage means, said data received from the operator and optionally from the supervisor; and
   (vii) transferring stored data by a transfer means to another storage device.

2. The electronic timed interval inspection reporting and data storage system of claim 1 wherein said means for receiving data input includes a keyboard.

3. The electronic timed interval inspection reporting and data storage system of claim 1 wherein said means for receiving data input includes a touch screen.

4. The electronic timed interval inspection reporting and data storage system of claim 1 wherein said data transfer means includes a portable data card.

5. The electronic timed interval inspection reporting and data storage system of claim 1 wherein said data transfer means includes a data modem.

6. The electronic timed interval inspection reporting and data storage system of claim 1 wherein said data transfer means includes a radio frequency transceiver.

7. The electronic timed interval inspection reporting and data storage system of claim 1 wherein said data transfer means includes an onboard printer.

8. The electronic timed interval inspection reporting and data storage system of claim 1 wherein said visual indicator device includes a flashing light source.

9. The electronic timed interval inspection reporting and data storage system of claim 1 further including a transmitter device adapted for signaling a pager device, the transmitter device activated upon operation of machinery without the machine operator answering the queries presented.

10. The electronic timed interval inspection reporting and data storage system of claim 1 further including one or more sensors adapted for monitoring machinery parameters, each sensor in communication with the on-board computer for reporting machinery parameter data, the data stored in the on-board computer storage means.

11. An electronic timed interval inspection reporting and data storage system for machinery comprising:
   an on-board computer associated with a machine, the on-board computer including a display screen for viewing queries, a keyboard for receiving data input by a machine operator, and data input by a supervisor in response to an input by said operator, said computer adapted for:
   (i) timing an interval to require the operator and optionally the supervisor to input data;
   (ii) presenting queries to the machine operator;
   (iii) receiving data input by the machine operator in response to said queries, said data including a unique identification assigned to the operator, and optionally for receiving a response from the supervisor, including a unique identification assigned to the supervisor, the supervisor response indicative of a machine problem;
   (iv) controlling a first relay device contained within a machine starter circuit which completes the machine starter circuit with the first relay device closed;
   (v) controlling a second relay device contained within a visual indicator device circuit which completes the visual indicator device circuit with the second relay device closed;
   (vi) storing data input in a storage means, said data received from the operator and optionally from the supervisor; and
   (vii) transferring stored data by a transfer means to another storage device.

12. The electronic timed interval inspection reporting and data storage system of claim 11 wherein said data transfer means includes a portable data card.

13. The electronic timed interval inspection reporting and data storage system of claim 11 wherein said data transfer means includes a data modem.

14. The electronic timed interval inspection reporting and data storage system of claim 11 wherein said data transfer means includes a radio frequency transceiver.

15. The electronic timed interval inspection reporting and data storage system of claim 11 wherein said data transfer means includes an onboard printer.

16. The electronic timed interval inspection reporting and data storage system of claim 11 wherein said visual indicator device includes a flashing light source.

17. The electronic timed interval inspection reporting and data storage system of claim 11 further including a transmitter device adapted for signaling a pager device, the transmitter device activated upon operation of machinery without the machine operator answering the queries presented.

18. The electronic timed interval inspection reporting and data storage system of claim 11 further including one or more sensors adapted for monitoring machinery parameters, each sensor in communication with the on-board computer for reporting machinery parameter data, the data stored in the on-board computer storage means.

19. A method for electronic timed interval inspection reporting and data storage for machinery comprising:
   (a) providing an on-board computer associated with a machine, the on-board computer including means for receiving data input by a machine operator, and data input by a supervisor in response to an input by said operator;
   (b) timing by said computer an interval to require the operator and optionally the supervisor to input data;
   (c) presenting queries by said computer to the machine operator;
   (d) receiving data input by said computer from the machine operator in response to said queries, said data including a unique identification assigned to the operator, and optionally for receiving a response from the supervisor, including a unique identification assigned to the supervisor, the supervisor response indicative of a machine problem;
   (e) controlling by said computer a first relay device contained within a machine starter circuit which completes the machine starter circuit with the first relay device closed;
   (f) controlling by said computer a second relay device contained within a visual indicator device circuit which completes the visual indicator device circuit with the second relay device closed;
   (g) storing data input by said computer in a storage means, said data received from the operator and optionally from the supervisor; and
   (h) transferring stored data by a transfer means from said computer to another storage device.

20. The method according to claim 19 wherein presenting queries to the machine operator includes providing a first set of queries to the operator while controlling the first relay device to disable the machine starter circuit and controlling the second relay device to enable the visual indicator circuit.

21. The method according to claim 19 wherein input data by the machine operator to the first set of queries indicative of a machine problem requires a response from the supervisor addressing the machine problem.

22. The method according to claim 19 wherein presenting queries to the machine operator includes providing a second set of queries to the operator while controlling the first relay device to enable the machine starter circuit and controlling the second relay device to enable the visual indicator circuit.

23. The method according to claim 19 wherein input data by the machine operator to the second set of queries indicative of a machine problem requires a response from the supervisor addressing the machine problem.

24. The method according to claim 19 further including maintaining the first relay device to enable the machine starter circuit and maintaining the second relay device to disable the visual indicator circuit for the duration of the timed inspection interval following input data to said first and second sets of queries.

25. The method according to claim 19 wherein at the start of a timed inspection interval, with the starter circuit first relay enabled and the visual display circuit second relay enabled, the disabling of the starter circuit first relay occurs only upon shut down of the machine.

26. The method according to claim 19 further including;
(i) providing a transmitter device adapted for signaling a pager device, the transmitter device activated upon operation of machinery without the machine operator answering the queries presented.

27. The method according to claim 19 further including;
(j) monitoring machinery parameters with one or more sensors, each sensor in communication with the on-board computer for reporting machinery parameter data, the data stored in the on-board computer storage means.

* * * * *